US009357032B2

(12) United States Patent
Ikeda

(10) Patent No.: US 9,357,032 B2
(45) Date of Patent: May 31, 2016

(54) COMMUNICATION APPARATUS CAPABLE OF RESTRICTING DESTINATION OF TRANSMISSION BY AUTHENTICATED USER, METHOD OF CONTROLLING THE COMMUNICATION APPARATUS, AND STORAGE MEDIUM

(75) Inventor: Atsushi Ikeda, Tokorozawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/083,006

(22) Filed: Apr. 8, 2011

(65) Prior Publication Data

US 2011/0271324 A1    Nov. 3, 2011

(30) Foreign Application Priority Data

Apr. 28, 2010 (JP) .................................. 2010-103192

(51) Int. Cl.
G06F 15/16 (2006.01)
H04L 29/08 (2006.01)
H04L 29/12 (2006.01)
H04L 29/06 (2006.01)

(52) U.S. Cl.
CPC ........ H04L 67/306 (2013.01); H04L 29/12122 (2013.01); H04L 29/12198 (2013.01); H04L 63/08 (2013.01); H04L 63/10 (2013.01)

(58) Field of Classification Search
CPC .................. H04L 29/12198; H04L 29/12122; H04L 63/08; H04L 63/10
USPC ...................... 726/3–21, 26–33; 709/220–226
See application file for complete search history.

(56) References Cited

U.S. PATENT DOCUMENTS

| 7,978,353 | B2 | 7/2011 | Kasatani |
| 8,281,372 | B1 * | 10/2012 | Vidal ................................ 726/5 |
| 2005/0256764 | A1 * | 11/2005 | Beaumont et al. .............. 705/14 |
| 2007/0027953 | A1 * | 2/2007 | Wu ............................... 709/206 |

(Continued)

FOREIGN PATENT DOCUMENTS

| JP | 2004222141 A | 8/2004 |
| JP | 2006-101484 A | 4/2006 |

(Continued)

OTHER PUBLICATIONS

Japanese Office Action cited in Japanese counterpart application No. JP2010-103192, dated Apr. 22, 2014.

Primary Examiner — Chris Parry
Assistant Examiner — Weiwei Stiltner
(74) Attorney, Agent, or Firm — Rossi, Kimms & McDowell LLP

(57) ABSTRACT

A communication apparatus having a transmission function for transmitting data to another apparatus using a transmission protocol selected from a plurality of transmission protocols. A multifunction printer (MFP) implementing the communication apparatus authenticates a user, and acquires destination information associated with the authenticated user. The MFP permits the use of a specific transmission protocol for transmission using the acquired destination information, and restricts the use of the specific transmission protocol for transmission using other destination information. Further, the MFP permits display of destination information matching the acquired destination information, but restricts display of other destination information, among destination information stored in a hard disk in association with the specific transmission protocol.

16 Claims, 15 Drawing Sheets

(56) References Cited

U.S. PATENT DOCUMENTS

| | | | |
|---|---|---|---|
| 2008/0047020 A1* | 2/2008 | Masui | 726/26 |
| 2009/0013057 A1* | 1/2009 | Suzuki | 709/217 |
| 2009/0070451 A1* | 3/2009 | Sakiyama et al. | 709/223 |
| 2009/0100155 A1* | 4/2009 | Lee | 709/220 |
| 2009/0201557 A1* | 8/2009 | Honma | 358/402 |
| 2010/0188697 A1* | 7/2010 | Maeda et al. | 358/1.15 |
| 2010/0199177 A1* | 8/2010 | Kraenzel et al. | 715/261 |
| 2011/0098089 A1* | 4/2011 | Irie et al. | 455/566 |
| 2011/0106889 A1* | 5/2011 | Scott et al. | 709/206 |

FOREIGN PATENT DOCUMENTS

| | | |
|---|---|---|
| JP | 2007067840 A | 3/2007 |
| JP | 2008294890 A | 12/2008 |

* cited by examiner

FIG.4

CONTEXT                              5000

| USER NAME | ikeda |
|---|---|
| PASSWORD | password |
| E-MAIL ADDRESS | ikeda@cocon.co.jp |
| SERVER | ¥¥192.168.0.1 |
| FOLDER PATH | ¥home¥ikeda |
| ⋮ | ⋮ |

COMMUNICATION APPARATUS CAPABLE OF RESTRICTING DESTINATION OF TRANSMISSION BY AUTHENTICATED USER, METHOD OF CONTROLLING THE COMMUNICATION APPARATUS, AND STORAGE MEDIUM

BACKGROUND OF THE INVENTION

1. Field of the Invention

The present invention relates to a communication apparatus which is capable of restricting transmission of data to other transmission destinations than a transmission destination associated with an authenticated user, a method of controlling the communication apparatus, and a storage medium storing a control program for implementing the method.

2. Description of the Related Art

In general, a communication apparatus requires authentication to use the same or its functions. On the other hand, a general image forming apparatus, such as a printer, is provided with a transmission and reception function, and exchanges data with an external apparatus. For example, the image forming apparatus receives a print job from the external apparatus, performs information processing on the print job, and then forms an image. That is, the image forming apparatus can be mentioned as a communication apparatus.

It is known that there is also proposed an image forming apparatus (hereinafter also referred to as "the device") which requires authentication to use the same or its functions. In this type of image forming apparatus, only a login-authenticated user is authorized to use the device. Further, there has been known application software that provides such authentication. The authentication will be hereinafter referred to as device authentication.

Furthermore, there has been proposed an image forming apparatus which permits only a login-authenticated user to use a specific function e.g. for data transmission or printing, and there has also been known application software that provides such authentication. This type of authentication will be hereinafter referred to as function authentication.

By the way, there has been proposed an image forming apparatus configured to store destination information (transmission destination) associated with a device-authenticated or function-authenticated user and have the transmission destination assigned to a button or the like. An image forming apparatus of this type enables a user to operate the button or the like to thereby easily transmit read image data to a transmission destination (the user's own address, for example) assigned to the button (see e.g. Japanese Patent Laid-Open Publication No. 2006-101484).

Further, there has been proposed transmission control application software configured to restrict transmission using a transmission protocol (hereinafter also simply referred to as "protocol") to a transmission destination associated with a user. The transmission using the transmission protocol includes E-mail transmission using the SMTP (simple mail transfer protocol) and file transmission using SMB (server message block), for example. In the application program, the number of protocols for use is limited to one.

The application software only restricts the destination of transmission using the transmission protocol to a transmission destination acquired in advance, and therefore a user interface can be realized with relative ease.

For example, let it be assumed that the transmission protocol is restricted to one for E-mail transmission, and while being provided that an address book function for storing a plurality of registered E-mail addresses, and the destination of E-mail transmission is restricted to the destination (e.g. a transmission destination associated with a user) which is acquired in advance. In this case, the above-mentioned restriction of destinations can be achieved by disabling the editing of registered E-mail addresses via the user interface and further disabling the use of the entire address book function.

However, in an image forming apparatus that can use a plurality of transmission protocols, if transmission using a specific transmission protocol is restricted to a destination associated with a user, there arises the following problem:

In general, in an image forming apparatus capable of using a plurality of transmission protocols, not only E-mail addresses but also destinations of file transmission using the SMB protocol and facsimile transmission using a FAX protocol are registered in an address book.

In an image forming apparatus of this type, if the use of the entire address book function is disabled, as a matter of course, it becomes impossible to select not only E-mail addresses but also destinations of file transmission or facsimile transmission.

Further, in general, an image forming apparatus which is capable of performing multiple destination transmission using a plurality of protocols is provided with a user interface that displays a list presenting a brief description of transmission protocols and transmission destinations. Some of the image forming apparatuses of this type are configured such that a user can select a specific transmission destination from the list and demand display of detailed information on the transmission destination via the user interface.

In addition, some image forming apparatuses are configured to display the detailed information in a manner enabling not only confirmation of the selected transmission destination but also editing or correction of destination information.

If the edit and correction of an acquired transmission destination are disabled in an image forming apparatus of this type, there arises the following problem:

For example, let it be assumed that an image forming apparatus is configured to acquire a destination of E-mail transmission and file transmission and permit a user to configure E-mail transmission or file transmission such that E-mails or files are transmitted to the destination thus acquired by the image forming apparatus, which may be an external apparatus used by the user himself/herself. In this case, if two protocols are used for transmission to the user, it is impossible to restrict the destination of transmission to the acquired destination, only for one of the two protocols (e.g. the SMB protocol).

The displayed detailed information can include, for example, an E-mail recipient name, a user name in file transmission, and authentication information, such as a password, which are not the destination itself.

Therefore, when considering a case where a password has to be changed after the lapse of a predetermined time period e.g. at a site of a customer where an image forming apparatus is installed, it is required to enable authentication information to be edited even though editing of the destination cannot be permitted.

SUMMARY OF THE INVENTION

The present invention provides a communication apparatus that is capable of performing transmission using one of a plurality of transmission protocols, and is configured such that while keeping available an address book function or the like associated with each of the transmission protocols, destination restriction can be set on a transmission protocol-bytransmission protocol basis, a method of controlling the communication apparatus, and a storage medium storing a program for implementing the method.

Further, the present invention provides a communication apparatus which enables displayed detailed information on a transmission destination to be edited according to transmission protocol-specific destination restrictions, a method of controlling the communication apparatus, and a storage medium storing a program for implementing the method.

In a first aspect of the present invention, there is provided a communication apparatus having a transmission function for transmitting data to another apparatus using a transmission protocol selected from a plurality of transmission protocols, comprising an authentication unit configured to authenticate a user, an acquisition unit configured to acquire a destination information item associated with the user authenticated by the authentication unit, a storage unit configured to store a plurality of destination information items, a setting unit configured to configure settings such that use of a specific transmission protocol for transmission using the destination information item acquired by the acquisition unit is permitted, and the use of the specific transmission protocol for transmission using other destination information items than the destination information item acquired by the acquisition unit is restricted, and a display restriction unit configured to be operable when the settings are configured by the setting unit, to permit display of a destination information item which matches the destination information item acquired by the acquisition unit, but to restrict display of destination information items other than the acquired destination information item, among the destination information items which are stored by the storage unit and associated with the specific transmission protocol.

In a second aspect of the present invention, there is provided a communication apparatus having a transmission function for transmitting data to another apparatus using a transmission protocol selected from a plurality of transmission protocols, comprising an authentication unit configured to authenticate a user, an acquisition unit configured to acquire a destination information item associated with the user authenticated by the authentication unit and detailed information on the destination information item, a destination table configured to store a plurality of destination information items and detailed information on each of the destination information items, and an edit restriction unit configured to be operable when a specific destination information item selected by the user authenticated by the authentication unit so as to check the detailed information is associated with a predetermined transmission protocol, to restrict editing of the detailed information on the specific destination information item.

In a third aspect of the present invention, there is provided a method of controlling a communication apparatus having a transmission function for transmitting data to another apparatus using a transmission protocol selected from a plurality of transmission protocols, comprising authenticating a user, acquiring a destination information item associated with the authenticated user, storing a plurality of destination information items, configuring settings such that use of a specific transmission protocol for transmission using the acquired destination information item is permitted, and the use of the specific transmission protocol for transmission using other destination information items than the acquired destination information item is restricted, and permitting, when the settings are configured, display of a destination information item which matches the acquired destination information item, but restricting display of destination information items other than the acquired destination information item, among the stored destination information items which are associated with the specific transmission protocol.

In a fourth aspect of the present invention, there is provided a method of controlling a communication apparatus that has a transmission function for transmitting data to another apparatus using a transmission protocol selected from a plurality of transmission protocols, and is provided with a destination table having a plurality of destination information items recorded therein and having detailed information on each of the destination information items stored therein, comprising authenticating a user, acquiring a destination information item associated with the authenticated user and detailed information on the destination information item, and restricting, when a specific destination information item selected by the authenticated user so as to check the detailed information is associated with a predetermined transmission protocol, editing of the detailed information on the specific destination information item.

In a fifth aspect of the present invention, there is provided a non-transitory computer-readable storage medium storing a computer-executable program for causing a computer to execute a method of controlling a communication apparatus having a transmission function for transmitting data to another apparatus using a transmission protocol selected from a plurality of transmission protocols, wherein the method comprises acquiring a destination information item associated with the authenticated user, storing a plurality of destination information items, configuring settings such that use of a specific transmission protocol for transmission using the acquired destination information item is permitted, and the use of the specific transmission protocol for transmission using other destination information items than the acquired destination information item is restricted, and permitting, when the settings are configured, display of a destination information item which matches the acquired destination information item, but restricting display of destination information items other than the acquired destination information item, among the stored destination information items which are associated with the specific transmission protocol.

In a sixth aspect of the present invention, there is provided a non-transitory computer-readable storage medium storing a computer-executable program for causing a computer to execute a method of controlling a communication apparatus that has a transmission function for transmitting data to another apparatus using a transmission protocol selected from a plurality of transmission protocols, and is provided with a destination table having a plurality of destination information items recorded therein and having detailed information on each of the destination information items stored therein, wherein the method comprises authenticating a user, acquiring a destination information item associated with the authenticated user and detailed information on the destination information item, and restricting, when a specific destination information item selected by the authenticated user so as to check the detailed information is associated with a predetermined transmission protocol, editing of the detailed information on the specific destination information item.

According to the present invention, while keeping available the address book function or the like associated with each of the transmission protocols, it is possible to set destination restriction on a transmission protocol-by-transmission protocol basis. Further, according to the present invention, it is possible to edit displayed detailed information on a transmission destination according to transmission protocol-specific destination restriction.

The features and advantages of the invention will become more apparent from the following detailed description taken in conjunction with the accompanying drawings.

BRIEF DESCRIPTION OF THE DRAWINGS

FIG. 4 is a diagram illustrating an example of a context described with reference to FIG. 3.

DETAILED DESCRIPTION OF THE EMBODIMENTS

The present invention will now be described in detail below with reference to the accompanying drawings showing an embodiment thereof. It should be noted that although the following description is given by taking as an example an image forming apparatus as a communication apparatus, the present invention can also be applied to an apparatus other than the image forming apparatus.

Figure 1:
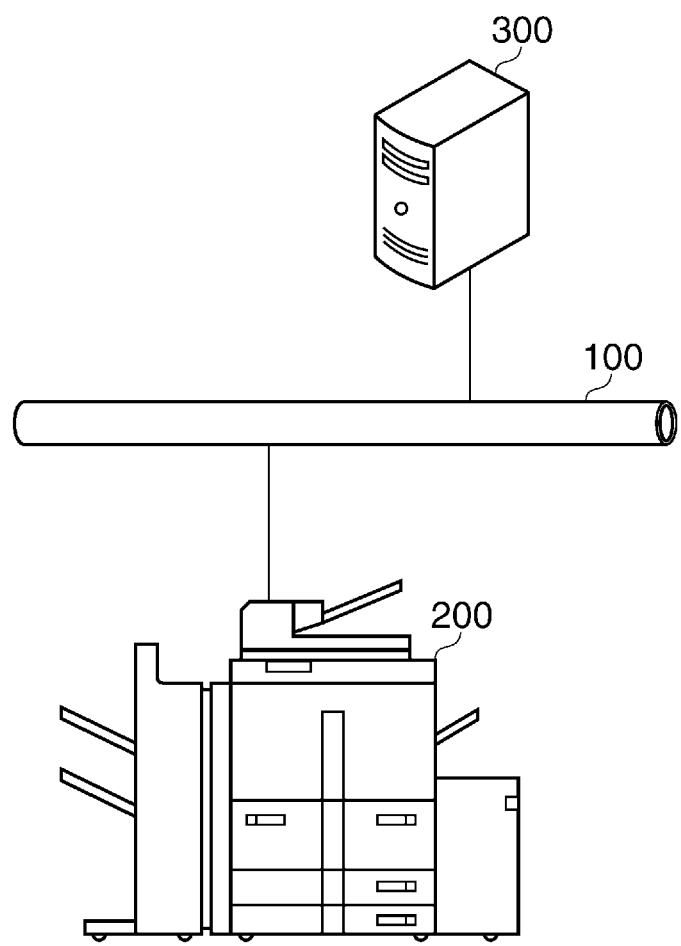
FIG. 1 is a diagram schematically illustrating, by way of example, the operational environment of an image forming apparatus as a communication apparatus according to an embodiment of the present invention.

FIG. 1 is a diagram schematically illustrating, by way of example, the operational environment of the image forming apparatus as the communication apparatus according to the embodiment of the present invention.

Referring to FIG. 1, the image forming apparatus shown in FIG. 1 is e.g. a multifunction printer (MFP) 200, which is connected to an LDAP (lightweight directory access protocol) server 300 (another apparatus) via a local area network (LAN) 100.

The MFP 200 communicates with the LDAP server 300 (another apparatus) using a predetermined transmission protocol (hereinafter also simply referred to as "protocol") and performs user authentication for transmission, described hereinafter. It should be noted that the protocol is well known, and therefore detailed description thereof is omitted.

The MFP 200 is provided with transmission and reception functions of transmitting and receiving data using at least two transmission protocols, when performing data transmission and reception with another apparatus, and permits a user authenticated during login to use the image forming apparatus or the functions provided in the image forming apparatus.

Figure 2:
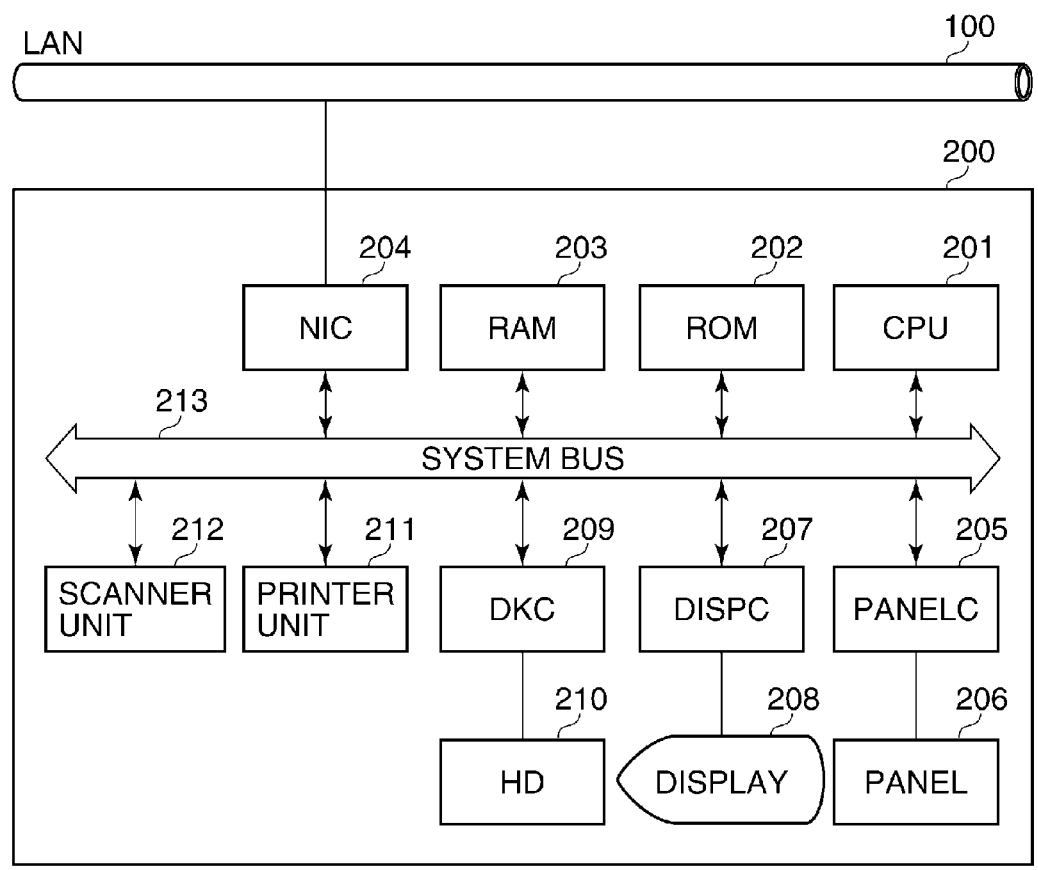
FIG. 2 is a block diagram of the hardware configuration of the image forming apparatus (MFP) appearing in FIG. 1.

FIG. 2 is a block diagram of the hardware configuration of the MFP 200 appearing in FIG. 1.

Referring to FIG. 2, the MFP 200 includes a CPU 201, a ROM 202, a RAM 203, a network interface card (NIC) 204, a panel controller (PANELC) 205 for controlling external input, and various kinds of buttons or a touch panel (hereinafter simply referred to as "the panel") 206. Further, the MFP 200 includes a display controller (DISPC) 207, a display 208, a disk controller (DKC) 209, and a hard disk (HD) 210. In the example shown in FIG. 2, the MFP 200 further includes a printer unit 211 and a scanner unit 212.

The CPU 201 not only performs centralized control of all the devices connected to a system bus 213 but also executes a firmware module stored in the ROM 202 or the HD 210 as a large-scale storage device. It should be noted that the firmware module comprises at least two modules, and can be updated on a module-by-module basis.

Further, the CPU 201 executes processes described hereinafter, based on firmware modules as control programs. The HD 210 can be used as a temporary storage area for storing image data. The RAM 203 is used as a main memory and a work area for the CPU 201.

The panel controller 205 performs control in response to instructions input via the panel 206. The display controller 207 controls the display 208 to display images on the same.

The network interface card 204 bidirectionally exchanges data with another MFP and a file server (other apparatuses: neither of which is shown) or the LDAP server 300 (see FIG. 1), via the LAN 100. The printer unit 211 forms an image on a recording sheet e.g. according to an electrophotographic process. The scanner unit 212 reads an image printed on a recording sheet.

It should be noted that the scanner unit 212 has an automatic document feeder (not shown) mounted thereon as an option unit, which enables the scanner unit 212 to automatically read a plurality of originals.

The MFP 200 shown in FIG. 2 requires transmission authentication, for example, as function authentication. It is assumed that in the case of performing transmission authentication, the MFP 200 communicates with the LDAP server 300 via the LAN 100 to perform user authentication. Then, a user authenticated by the transmission authentication is permitted to use the transmission function of the MFP 200, as described hereinbefore.

Figure 3:
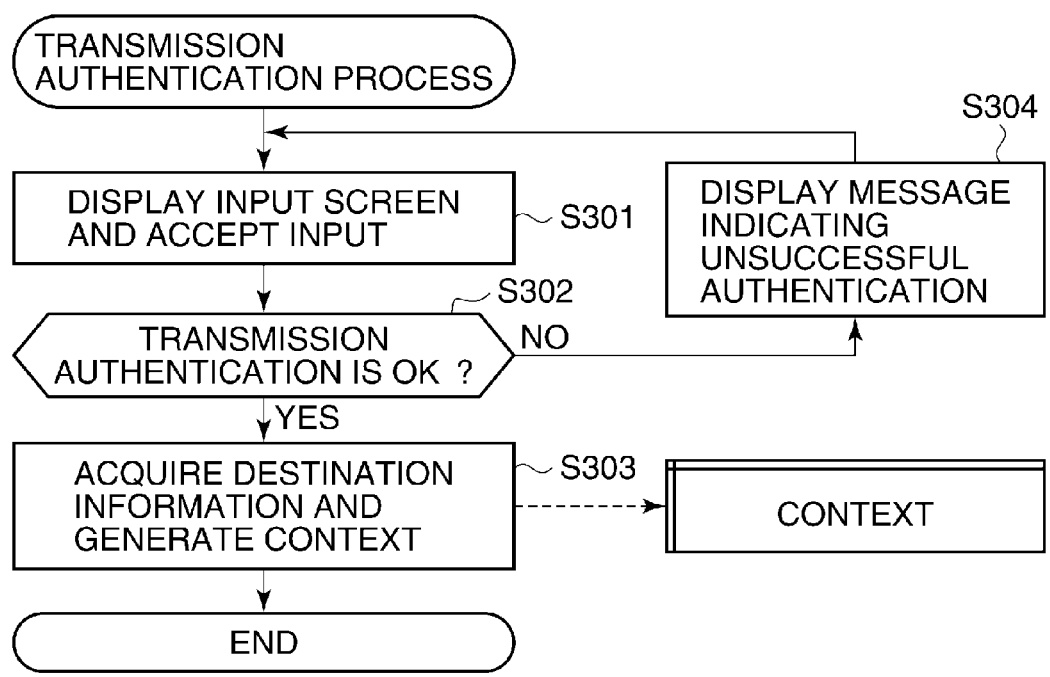
FIG. 3 is a flowchart of a transmission authentication process executed by the MFP shown in FIG. 2.

FIG. 3 is a flowchart of a transmission authentication process executed by the MFP 200 shown in FIG. 2.

Referring to FIGS. 1 to 3, a program for executing processing for transmission authentication and destination information acquisition is stored in the HD 210 appearing in FIG. 2 together with other programs. When the power of the MFP 200 is turned on, the program is loaded in the RAM 203 by the CPU 201.

When the user issues a request for starting transmission operation, the CPU 201 starts the transmission authentication process. The CPU 201 controls the display controller 207 to display an input screen on the display 208 so as to prompt the user to input a user name and a password (step S301). Then, the CPU 201 accepts the user name and the password input by the user via the panel 206. Thereafter, the CPU 201 awaits a login request for transmission authentication.

Upon receipt of the login request, the CPU 201 controls the network interface card 204 and thereby accesses the LDAP server 300 via the LAN 100. Specifically, the CPU 201 requests, using a predetermined protocol, the LDAP server 300 to perform authentication by the input user name and password.

When the LDAP server 300 receives the authentication request, it verifies the received user name and password and then sends the result of the authentication to the MFP 200 using the predetermined transmission protocol. Upon receipt of the authentication result, the CPU 201 proceeds to a step S302.

In the step S302, the CPU 201 determines whether or not the authentication result indicates success (OK) of the authentication. If the authentication result indicates success (YES to the step S302), the CPU 201 acquires directory information associated with the user from the LDAP server 300, using the authentication result (OK) (step S303).

Specifically, the CPU 201 requests, using the predetermined transmission protocol, the LDAP server 300 to search for an E-mail attribute value and a home directory attribute value associated with the user. Then, the CPU 201 acquires the result of the search from the LDAP server 300.

Thereafter, the CPU 201 stores (indicated by a broken-line arrow in FIG. 3) the user name and the password used for the authentication, the IP address of the LDAP server 300, and information on an E-mail address, a folder path, etc. obtained by the search, as a context (transmission address information), in the RAM 203. After having stored the context in the RAM 203, the CPU 201 terminates the transmission authentication process.

If it is determined in the step S302 that the authentication result does not indicate success, i.e. if it indicates no good (NG) (NO to the step S302), the CPU 201 causes the display controller 207 to display a message saying that the authentication is unsuccessful (step S304). Then, the CPU 201 returns to the step S301.

FIG. 4 is a diagram illustrating an example of the context 5000 mentioned with reference to FIG. 3.

In FIG. 4, the context 5000 includes a user name field, a password field, an E-mail address field, a server field, and a folder path field. In the example illustrated in FIG. 4, the user name field stores "ikeda", and the password field stores "password". The example illustrated in FIG. 4 shows that an authentication request was issued by using "ikeda" as a user name and "password" as a password, and authentication was performed by the LDAP server 300.

Further, "ikeda@conon.co.jp" has been acquired as an E-mail address as an E-mail attribute value. Furthermore, "¥home¥ikeda" has been acquired as a home directory attribute value. The home directory attribute value does not contain a server name, and therefore an IP address "¥¥192.168.0.1" of the LDAP server 300 is set in the server field.

Figure 5:
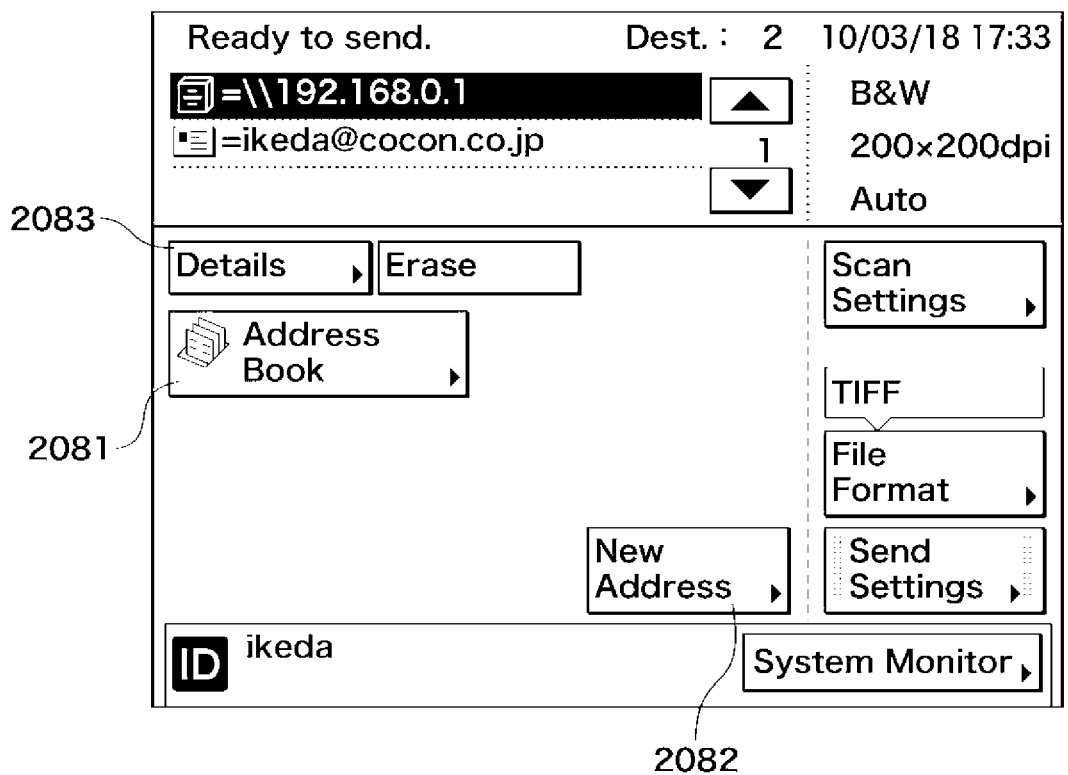
FIG. 5 is a view illustrating an example of a screen displayed for selection of a transmission destination on the MFP 2.

FIG. 5 is a view illustrating an example of a screen displayed for setting a transmission destination on the MFP 200 shown in FIG. 2.

Referring to FIG. 5, in setting a transmission destination, the MFP 200 described with reference to FIG. 2 can display an address book for selection therefrom, and it is also possible to directly enter a new transmission destination. The screen illustrated in FIG. 5 is displayed when transmission authentication described with reference to FIG. 3 is successfully performed and the user's own E-mail address and folder path are selected as a transmission destination by an operation described hereinafter.

Figure 6:
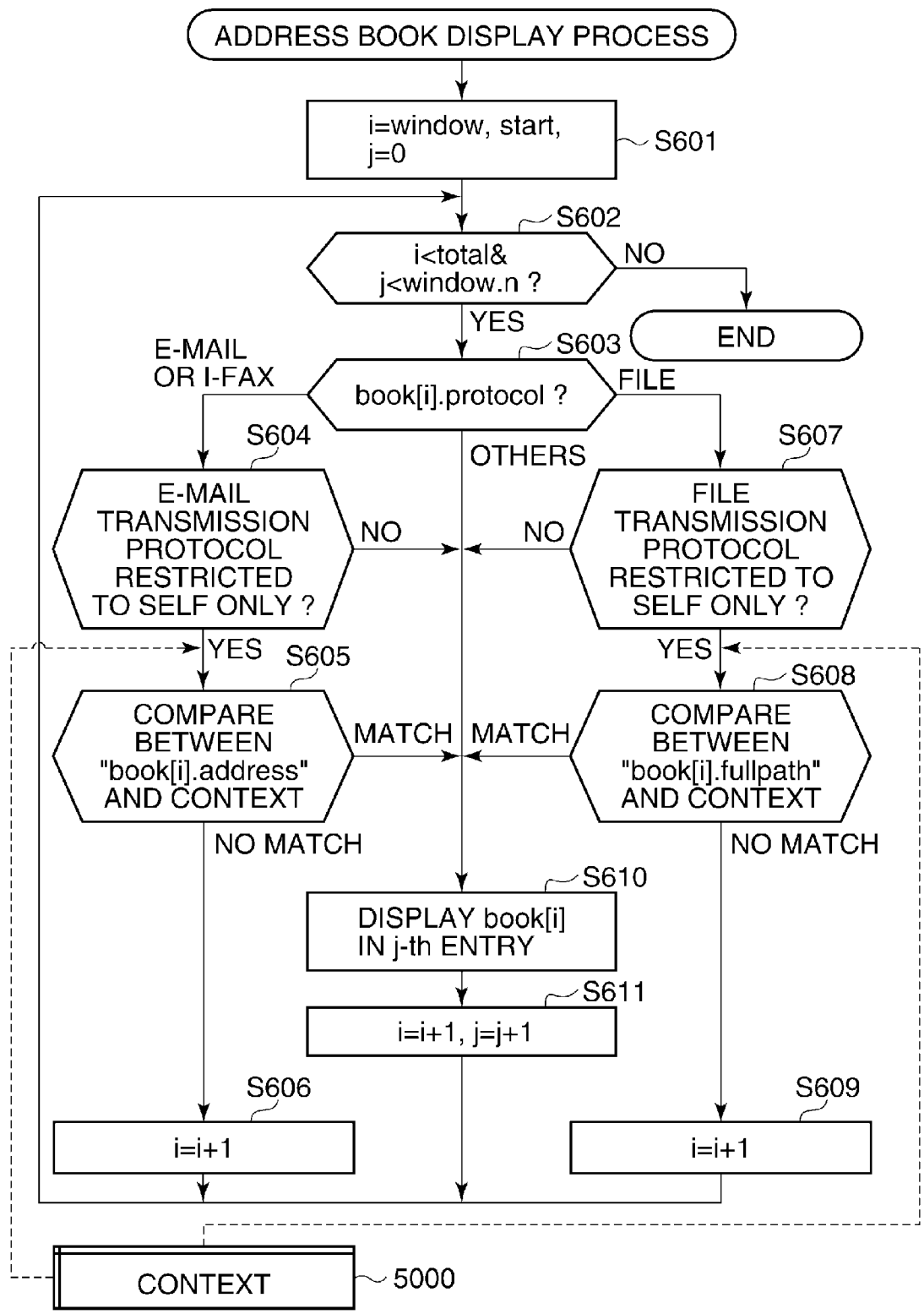
FIG. 6 is a flowchart of an address book display process executed by the MFP 2.

FIG. 6 is a flowchart of an address book display process executed by the MFP 200 shown in FIG. 2.

Referring to FIGS. 2, 5, and 6, when an address book button (Address Book) 2081 appearing in FIG. 5 is pressed, the CPU 201 starts the address book display process. It should be noted that data concerning the address book is stored in advance in the HD 210. For example, the association between a transmission destination and a transmission protocol is registered in the address book, on an address-by-address basis.

When the address book display process is started, the CPU 201 initializes a reference index "i" and a display index "j" (step S601). Immediately after a click on the address book button 2081, i=window.start and j=0 are set. As a scroll button, not shown, of the address book is pressed, the CPU 201 increments or decrements the value of the reference index "i" and that of the display index "j" within respective ranges of positive integers.

Then, the CPU 201 checks whether or not the address book has remaining information (data) to be displayed and whether or not the number of information items to be displayed exceeds a displayable number of items limited by screen-related restrictions on the display 208 (step S602).

More specifically, the CPU 201 checks whether or not the reference index "i" is smaller than a total registration count "total" indicative of the total number of registered items (i<total?). Further, the CPU 201 checks whether or not the display index "j" is smaller than a displayable item count "window.n" indicative of the displayable number of registered items (j<window.n?).

If the reference index "i" is not smaller than the total registration count "total" (NO to the step S602), the CPU 201 judges that there is no information to be displayed, and immediately terminates the address book display process.

Further, if the display index "j" is not smaller than the displayable item count "window.n" (NO to the step S602), the CPU 201 judges that there is no area for display on the screen of the display 208, and immediately terminates the address book display process.

In the example shown in FIG. 6, the displayable item count "window.n" is set to 5 in the MFP 200, as referred to hereinafter.

On the other hand, if the reference index "i" is smaller than the total registration count "total" and the display index "j" is smaller than the displayable item count "window.n" (YES to the step S602), in other words, if there is information to be displayed and there is a remaining display area, the CPU 201 checks the type of a transmission protocol (hereinafter also simply referred to as "protocol") book[i].protocol associated with a destination information item (transmission destination) registered in an i-th entry of the address book (step S603).

If the protocol is for E-mail transmission or I-FAX (Internet FAX: transmission and reception of FAX using E-mail) (E-mail or I-FAX in the step S603), the CPU 201 checks and determines whether or not the protocol for E-mail or I-FAX transmission (E-mail transmission protocol; e.g. SMTP) has been set such that the use thereof is restricted only to the address acquired during the transmission authentication process (i.e. the context) (self only?) (step S604).

If the use of the protocol for E-mail or I-FAX transmission is restricted (YES to the step S604), the CPU 201 compares between an E-mail or I-FAX address "book[i].address" (the transmission destination) registered in the i-th entry of the address book and the E-mail address (transmission address) stored in the above-mentioned context 5000 (step S605).

If it is determined by the comparison that the two do not match (NO to the step S605), the CPU 201 increments the reference index "i" by 1 (step S606), and then returns to the step S602 to continue the process.

If it is determined in the step S603 that the protocol associated with the destination information item registered in the i-th entry of the address book is for file transmission (File in the step S603), the CPU 201 checks whether or not the protocol for file transmission (file transmission protocol; e.g. SMB) has been set such that the use thereof is restricted only to a network folder path during the transmission authentication process alone (self only?) (step S607).

If the use of the protocol is restricted only to the network folder path acquired during the transmission authentication process (YES to the step S607), the CPU 201 compares between a network folder path "book[i].fullpath" registered in the i-th entry of the address book in association with file transmission and a server and folder path (i.e. transmission address) stored in the context 5000 (step S608).

Specifically, the CPU 201 performs the comparison using a full path, such as "¥¥192.168.0.1¥home¥ikeda" obtained by concatenating the IP address of the server and the folder path.

If it is determined by the comparison that the two do not match (NO to the step S608), the CPU 201 increments the reference index "i" by 1 (step S609), and then returns to the step S602 to continue the process.

If it is determined in the step S603 that the protocol associated with the destination information item (transmission destination) registered in the i-th entry of the address book is for FAX transmission or another transmission (Others in the step S603), the CPU 201 displays destination information "book[i]" registered in the i-th entry of the address book, in a j-th entry of a list in the display area (step S610).

Then, the CPU 201 increments each of the reference index "i" and the display index "j" by 1 (step S611), and then returns to the step S602 to continue the process.

If the use of the transmission protocol for E-mail or I-FAX transmission is not restricted (NO to the step S604), the CPU 201 proceeds to the step S610, wherein the CPU 201 displays the destination information "book[i]" registered in the i-th entry of the address book, in the j-th entry of the list in the display area.

Also, if the CPU 201 determines in the step S605, based on the result of the comparison, that the two match (YES to the step S605), the CPU 201 proceeds to the step S610.

Similarly, if the CPU 201 determines in the step S607 that the use of the protocol is not restricted only to the network folder path acquired during the transmission authentication process (NO to the step S607), the CPU 201 proceeds to the step S610. Also, if the CPU 201 determines in the step S608, based on the result of the comparison, that the two match (YES to the step S608), the CPU 201 proceeds to the step S610.

As described above, the CPU 201 compares between a transmission destination to which the use of the protocol is restricted and a context associated therewith, and determines, based on the result of the comparison, whether or not to restrict the display of the transmission destination.

Figure 7:
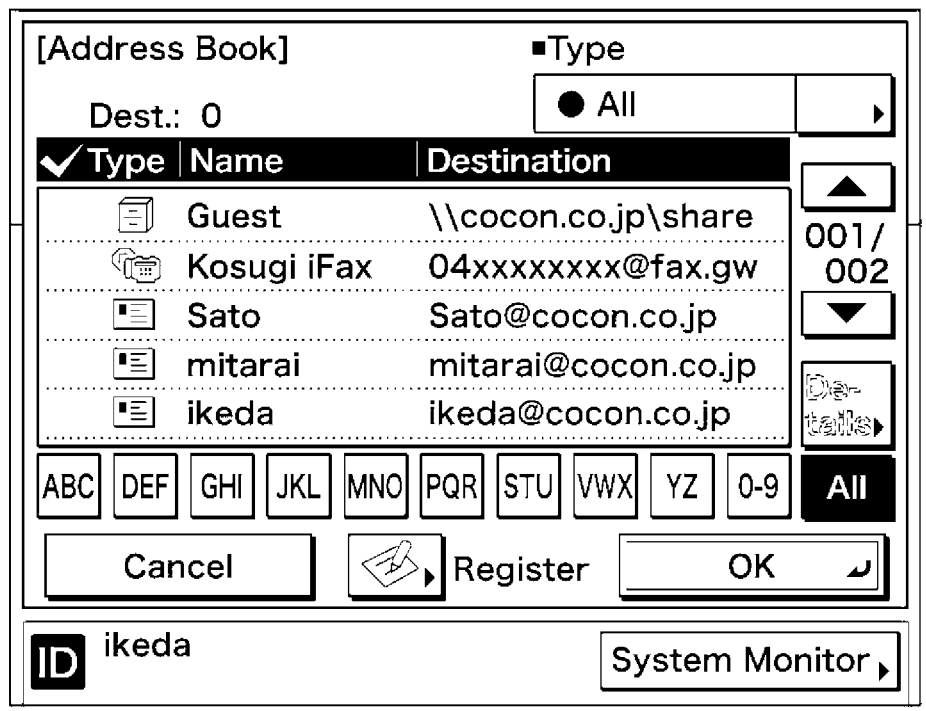
FIG. 7 is a view illustrating an example of an address book screen displayed on the MFP 2.

FIG. 7 is a view illustrating an example of an address book screen displayed on the MFP 200 shown in FIG. 2.

The address book screen illustrated in FIG. 7 by way of example is displayed in a case where the setting of the E-mail transmission protocol and the setting of the file transmission protocol as the transmission protocols associated with destination information (transmission destinations) in the address book, which are determined in the steps S604 and S607 of the address book display process described with reference to FIG. 6, respectively, are such that both of them are without restrictions in the use thereof.

Figure 8:
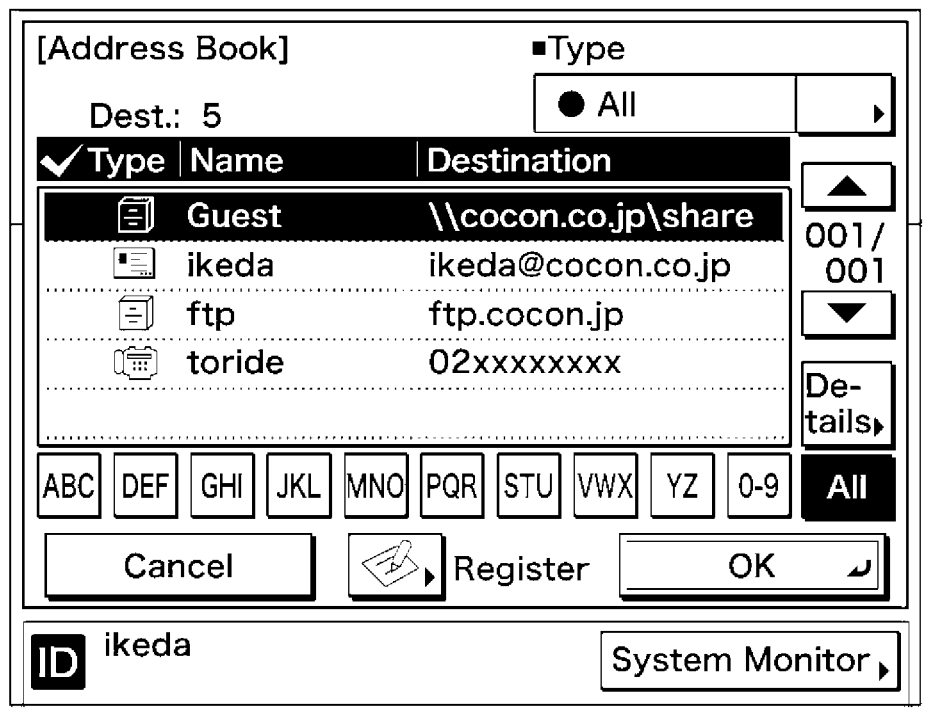
FIG. 8 is a view illustrating another example of the address book screen displayed on the MFP 2.

FIG. 8 is a view illustrating another example of the address book screen displayed on the MFP 200 shown in FIG. 2.

In the example illustrated in FIG. 8, it is assumed that the same items (information) as shown in the example illustrated in FIG. 7 are registered in the address book. Further, it is assumed that a user logs in using the user name "ikeda" and the context 5000 described with reference to FIG. 4 is stored in the MFP 200. In addition, the setting of the transmission protocol for E-mail transmission which is determined in the step S604 of the address book display process described with reference to FIG. 6 is such that the use thereof is restricted to the address acquired during the transmission authentication process (information registered in the context), whereas the setting of the transmission protocol for file transmission which is determined in the step S607 of the same is such that the use thereof is without restrictions. In such a case, the address book screen illustrated in FIG. 8 is displayed on the display screen 208.

Referring to FIGS. 7 and 8, it can be understood that the E-mail address "ikeda" is listed in the address book screen shown in FIG. 8, but an I-FAX address "kosugi iFax" and E-mail addresses (transmission destinations) "sato" and "mitarai" are not.

Figure 9:
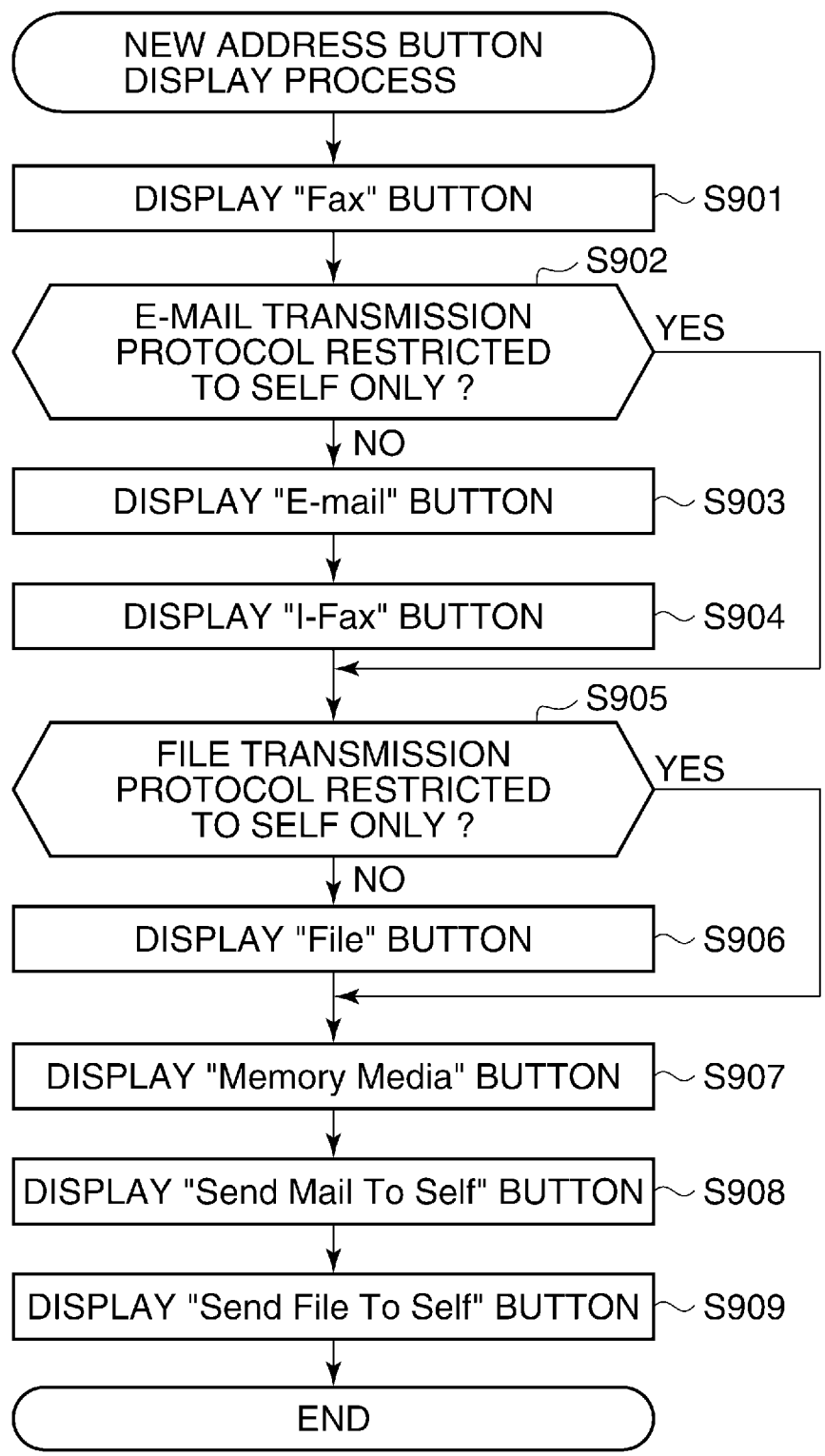
FIG. 9 is a flowchart of a new address button display process executed by the MFP 2.

FIG. 9 is a flowchart of a new address button display process executed by the MFP 200 shown in FIG. 2.

Referring to FIGS. 2, 5, and 9, when a new address button (New Address) 2082 appearing in FIG. 5 is pressed, the CPU 201 starts the new address button display process. In the present example, the CPU 201 controls the display of virtual buttons displayed on the display 208 thereby restricting the selection of a transmission protocol by the user via the panel 206 for transmission to a new destination.

It should be noted that selectable transmission protocols are classified into the five categories of "Fax", "E-mail", "I-FAX", "File", and "Memory Media", for example.

When the new address button 2082 appearing in FIG. 5 is pressed, first, the CPU 201 causes the display controller 207 to display a Fax button on the display 208 (step S901). Then, the CPU 201 checks whether or not the transmission protocol for E-mail transmission has been set such that the use thereof is restricted only to the address acquired during the transmission authentication process (information registered in the context) (Self Only in a step S902), so as to enable restriction of destinations on a protocol-by-protocol basis while enabling designation of multiple destination transmission using a plurality of transmission protocols.

If the transmission protocol for E-mail transmission has not been set such that the use thereof is restricted only to the acquired address (NO to the step S902), the CPU 201 causes the display controller 207 to display an "E-mail" button on the display 208 (step S903).

Then, the CPU 201 causes the display controller 207 to display an "I-Fax" button on the display 208 (step S904) and checks whether or not the transmission protocol for file transmission has been set such that the use thereof is restricted only to the network folder path acquired during the transmission authentication process (information registered in the context) (Self Only in a step S905).

If the transmission protocol for file transmission has not been set such that the use thereof is restricted only to the acquired network folder path (NO to the step S905), the CPU 201 causes the display controller 207 to display a "File" button on the display 208 (step S906).

Thereafter, the CPU 201 causes the display controller 207 to display a "Memory Media" button on the display 208 (step S907). Thus, selection between the above-mentioned five protocols is enabled.

Then, the CPU 201 causes the display controller 207 to display a "Send Mail To Self (mail transmission to the user himself/herself)" button on the display 208 (step S908). When the "Send Mail To Self" button is pressed, the CPU 201 designates the E-mail address stored in the context 5000 as a destination.

Then, the CPU 201 controls the display controller 207 to display a "Send File To Self" (file transmission to the user himself/herself) button on the display 208 (step S909), followed by terminating the new address button display process.

When the "Send File To Self" button displayed on the display 208 is pressed, the CPU 201 designates a network folder uniquely determined based on the server and folder path stored in the context 5000, as a destination (transmission destination).

When the "Send Mail To Self" button or the "Send File To Self" button is pressed, the CPU 201 causes the display controller 207 to display a list of the E-mail address and server of the context 5000 in a simplified fashion on the display 208 as illustrated in FIG. 5.

If it is determined in the step S902 that the transmission protocol for E-mail transmission has been set such that the use thereof is restricted only to the address acquired during the transmission authentication process (YES to the step S902), the CPU 201 skips over the steps S903 and S904 to the step S905.

As a consequence, neither the "E-mail" button nor the "I-Fax" button is displayed on the display 208 (non-display state), which disables designation of the E-mail transmission protocol for E-mail addresses except the E-mail address stored in the context 5000.

Similarly, if it is determined in the step S905 that the transmission protocol for file transmission has been set such that the use thereof is restricted only to the network folder path acquired during the transmission authentication process (YES to the step S905), the CPU 201 skips over the step S906 to the step S907.

As a consequence, the "File" button is not displayed on the display 208 (non-display state), which disables designation of the file transmission protocol for network folders except a network folder uniquely determined based on the server and the folder path stored in the context 5000.

Figure 10:
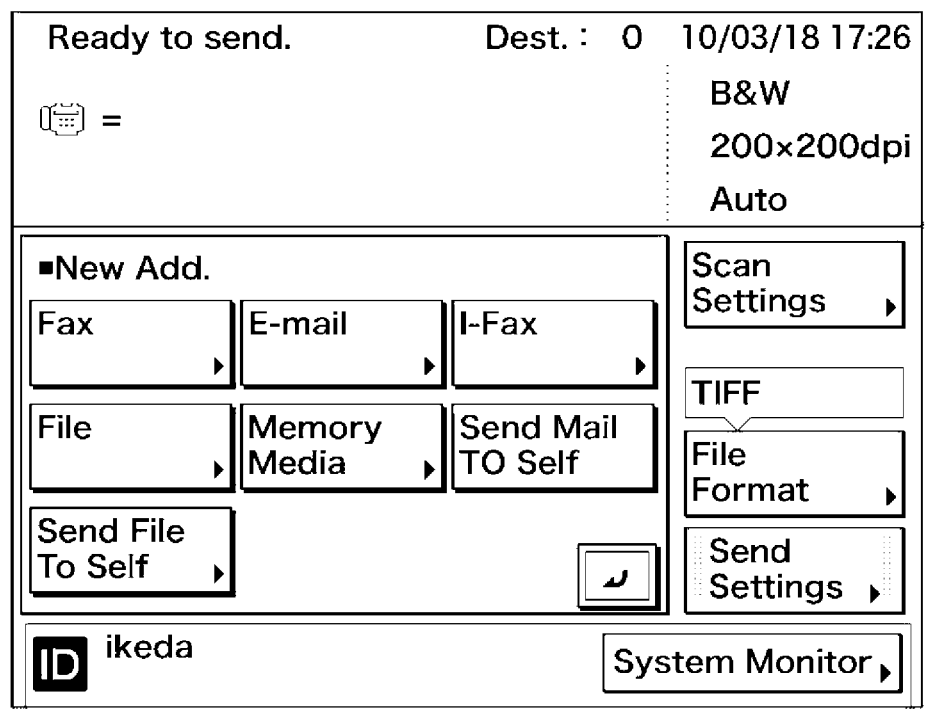
FIG. 10 is a view illustrating an example of a new address screen displayed after execution of the new address button display process described with reference to FIG. 9.

FIG. 10 is a view illustrating an example of a new address screen displayed after execution of the new address button display process described with reference to FIG. 9.

FIG. 10 illustrates a case where the setting of the transmission protocol for E-mail transmission and the setting of the transmission protocol for file transmission which are determined in the new address button display process described above with reference to FIG. 9 are both set such that the use thereof is without restrictions.

In the example illustrated in FIG. 10, the buttons ("Fax", "E-mail", "I-Fax", "File", and "Memory Media") for selecting the respective five protocols are displayed as described with reference to FIG. 9. Further, in the illustrated example, the "Send Mail To Self" button and the "Send File To Self" button are also displayed.

Figure 11:
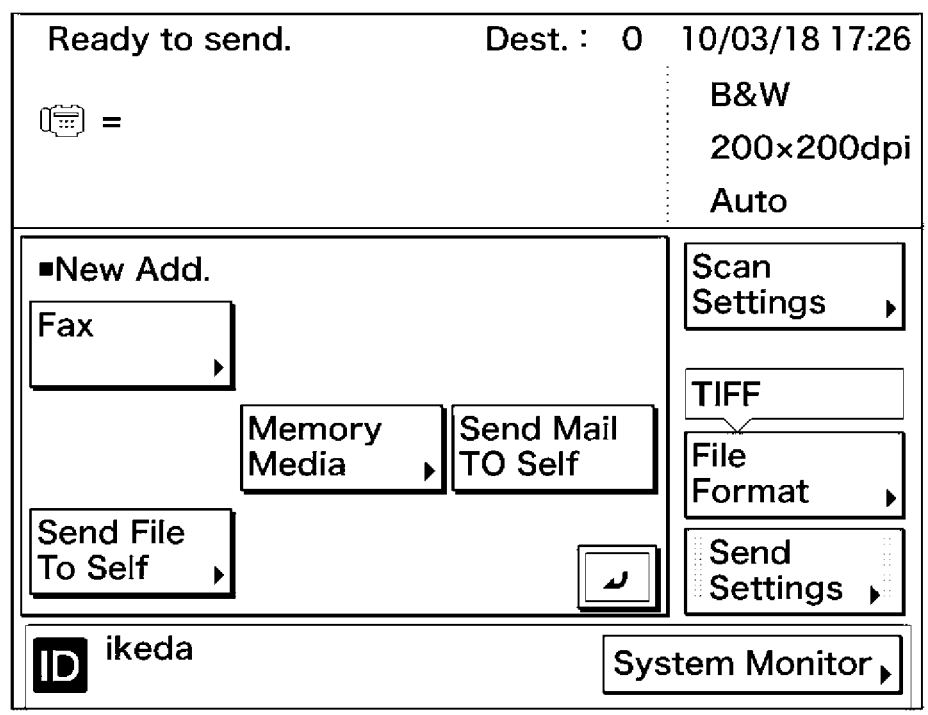
FIG. 11 is a view illustrating another example of the new address screen displayed after execution of the new address button display process.

FIG. 11 is a view illustrating another example of the new address screen displayed after execution of the new address button display process described with reference to FIG. 9.

FIG. 11 illustrates a case where the setting of the transmission protocol for E-mail transmission and the setting of the transmission protocol for file transmission which are determined in the new address button display process described above with reference to FIG. 9 are both set such that the use thereof is restricted.

As described with reference to FIG. 9, the display of the "E-mail" button and the "I-Fax" button is disabled by execution of the step S902, and the display of the "File" button is disabled by execution of the step S905.

As a consequence, in the example illustrated in FIG. 11, on the new address screen, there are displayed the "Fax" button and the "Memory Media" button, as well as the "Send Mail To Self" button and the "Send File To Self" button.

Figure 12:
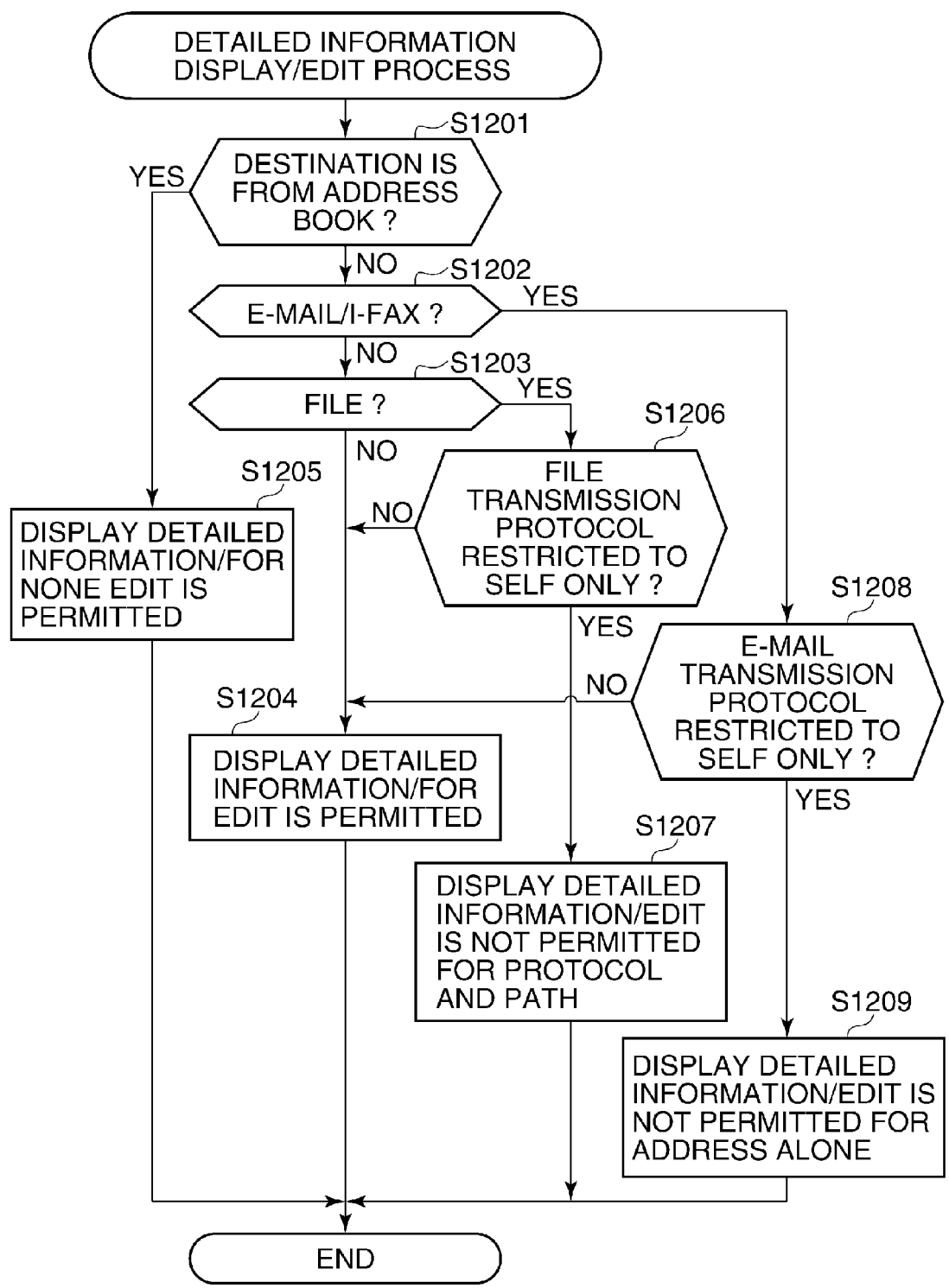
FIG. 12 is a flowchart of a detailed information display and edit process executed by the MFP shown in FIG. 2.

FIG. 12 is a flowchart of a detailed information display and edit process executed by the MFP 200 shown in FIG. 2.

Referring to FIGS. 2, 5, and 12, when the user selects one of the addresses on the screen shown in FIG. 5 to confirm detailed information on the address, and presses a detailed information button (Details) 2083, the CPU 201 starts the detailed information display and edit process.

First, the CPU 201 determines whether or not the address selected to check the detailed information is designated from the address book (step S1201). If the address is not designated from the address book (NO to the step S1201), the CPU 201 determines whether or not the address (transmission destination) selected to check the detailed information is for E-mail transmission or for I-FAX transmission (step S1202).

If the address is not for E-mail transmission or I-FAX transmission (NO to the step S1202), the CPU 201 determines whether or not the address selected to check the detailed information is for file transmission (step S1203).

If the address is not for file transmission (NO to the step S1203), the CPU 201 causes the display controller 207 to display detailed information on the address on the display 208 (step S1204).

In this case, the CPU 201 permits editing of all items of the detailed information. In short, the edit is enabled. In other words, when the address is not one selected from the address book and when the transmission protocol is not either for E-mail transmission/I-FAX transmission or for file transmission, the CPU 201 cancels the restrictions on the editing of the detailed information on the address.

Further, even when the address is not selected from the address book, if the address is associated with a login-authenticated user, the CPU 201 cancels the restriction of editing of the detailed information on the address. Then, the CPU 201 terminates the detailed information display and edit process.

On the other hand, if it is determined in the step S1201 that the address selected to check the detailed information is designated from the address book (YES to the step S1201), the CPU 201 causes the disk controller 207 to display the detailed information on the address on the display 208. In this case, the CPU 201 inhibits editing of all items of the detailed information (step S1205). In short, the edit is disabled.

In this case, the items concerning the addresses registered in the address book are only displayed on the display 208, but the editing of the items is inhibited. Then, the CPU 201 terminates the detailed information display and edit process.

If it is determined in the step S1203 that the address selected to check the detailed information is for file transmission (YES to the step S1203), the CPU 201 checks whether or not the transmission protocol for file transmission (i.e. the file transmission protocol) has been set such that the use thereof is restricted only to a network folder path acquired during the transmission authentication process (step S1206).

If the transmission protocol has been set such that the use thereof is restricted only to a network folder path acquired during the transmission authentication process (YES to the step S1206), the CPU 201 causes the display controller 207 to display the detailed information on the selected address on the display 208.

Further, the CPU 201 inhibits change of the network folder path to thereby prevent change of the network folder path (path) (step S1207).

At the same time, the CPU 201 prevents the protocol for file transmission from being changed (edit disabled). The CPU 201 terminates the detailed information display and edit process.

If it is determined in the step S1206 that the transmission protocol for file transmission has not been set such that the use thereof is restricted only to a network folder path acquired during the transmission authentication process (NO to the step S1206), the CPU 201 proceeds to the step S1204.

If it is determined in the step S1202 that the address selected to check the detailed information is for E-mail transmission or I-FAX transmission (YES to the step S1202), the CPU 201 checks whether or not the transmission protocol for E-mail transmission (mail transmission protocol) has been set such that the use thereof is restricted only to an E-mail address acquired during the transmission authentication process (step S1208).

If the transmission protocol has not been set such that the use thereof is restricted only to an E-mail address acquired during the transmission authentication process (NO to the step S1208), the CPU 201 proceeds to the step S1204.

On the other hand, if the transmission protocol has been set such that the use thereof is restricted only to an E-mail address acquired during the transmission authentication process (YES to the step S1208), the CPU 201 causes the display controller 207 to display the detailed information on the selected address on the display 208. Further, the CPU 201 inhibits change of the address (Address) to thereby prevent change of the address (step S1209).

At the same time, the CPU 201 prevents the protocol for E-mail transmission and I-FAX from being changed, followed by terminating the detailed information display and edit process.

Figure 13:
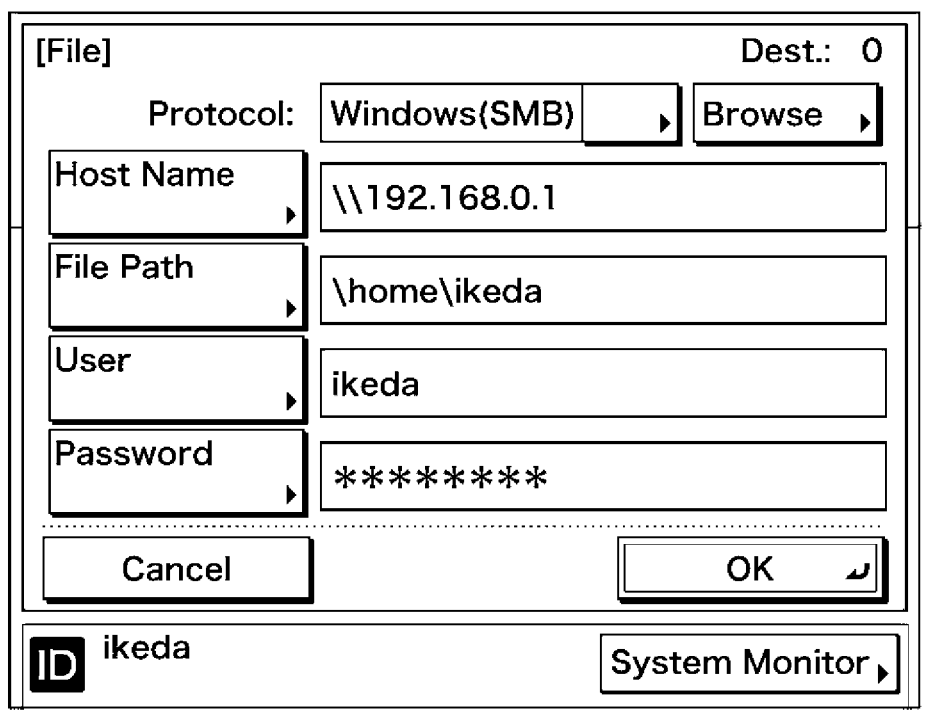
FIG. 13 is a view illustrating an example of a screen obtained by the detailed information display and edit process described with reference to FIG. 12.

FIG. 13 is a view illustrating an example of a screen obtained by the detailed information display and edit process described with reference to FIG. 12.

The screen illustrated in FIG. 13 is displayed when it is determined in the step S1206 in FIG. 12 that the file transmission protocol has not been set such that the use thereof is restricted only to a network folder path acquired during the transmission authentication process. In this case, the items of the detailed information are all displayed as shown in FIG. 13, and the editing of the items is enabled.

Further, on the screen illustrated in FIG. 13, a list box is displayed such that a protocol for file transmission ("Windows (SMB)" in the illustrated example) can be selected, and a browse button (Browse) is also displayed for referring to folders when the protocol is SMB.

Figure 14:
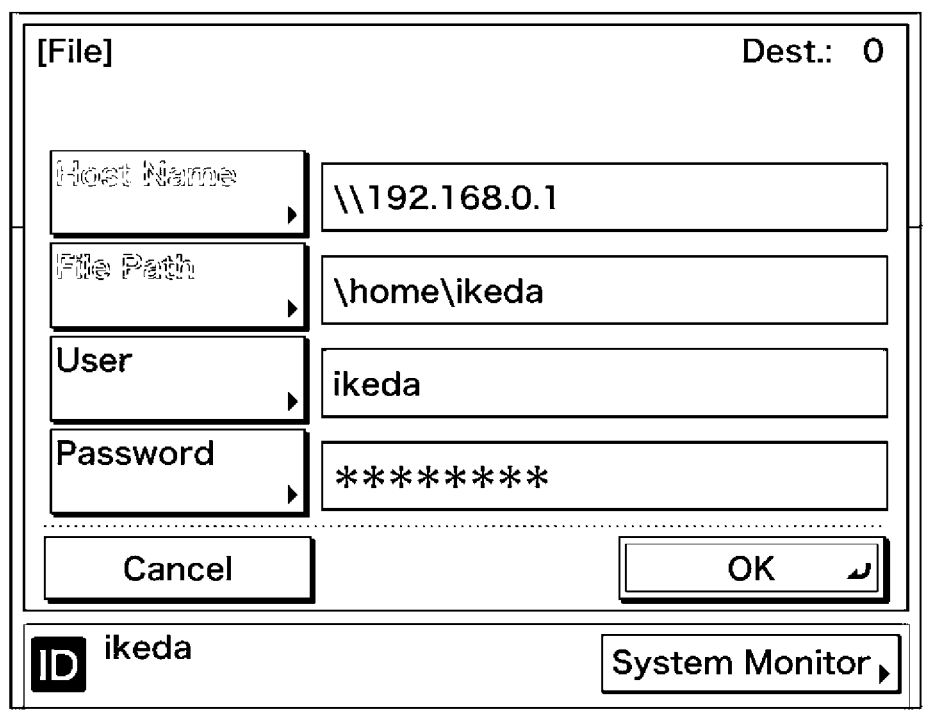
FIG. 14 is a view illustrating another example of the screen obtained by the detailed information display and edit process.

FIG. 14 is a view illustrating another example of the screen obtained by the detailed information display and edit process described with reference to FIG. 12.

The screen illustrated in FIG. 14 is displayed on the display 208 in the step S1207 in FIG. 12. In this case, as described hereinbefore, the detailed information on the selected address is displayed on the display 208, but the change of the network folder path is inhibited. The change of the protocol for file transmission is also inhibited.

On the screen illustrated in FIG. 14, a server button (Host Name) and a folder path button (File Path) are grayed out. Further, the browse button for referring to folders is not displayed. This prevents the user from changing the network folder path.

The list box for selecting a protocol is not displayed, either, so that the user cannot change the protocol. On the other hand, the editing of the user name (User) and the password (Password) is permitted.

Figure 15:
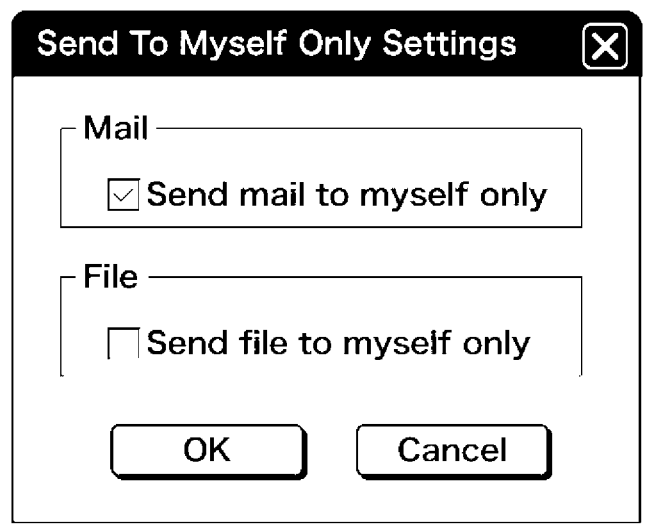
FIG. 15 is a view illustrating an example of a user interface screen for use in changing settings when E-mail transmission or file transmission is restricted in the MFP shown in FIG. 2.

FIG. 15 is a view illustrating an example of a user interface screen for use in changing settings when E-mail transmission or file transmission is restricted in the MFP 200 in FIG. 2.

The user interface screen illustrated in FIG. 15 is used to change settings for use in determination in the steps S604 and S607 in FIG. 6, the steps S902 and S905 in FIG. 9, and the steps S1206 and S1208 in FIG. 12, for example.

In the example shown in FIG. 15, settings are to be changed such that the use of the transmission protocol for E-mail transmission is restricted only to an address acquired during the transmission authentication process, and the use of the transmission protocol for file transmission is not restricted to a network folder path acquired during the transmission authentication process.

When an OK button appearing in FIG. 15 is pressed, the CPU 201 holds the settings in the HD 210 appearing in FIG. 2, according to the checked states of respective check boxes on the user interface screen. In the illustrated example, a check mark is placed in a check box associated with "Send mail to myself only".

By using the above-described user interface screen, while keeping available the function of multiple destination transmission using a plurality of protocols in a mixed manner and the address book function or the like concerning a plurality of protocols, it is possible to determine whether or not to set destination restriction on a protocol-by-protocol basis (i.e. whether or not to permit the use of each protocol).

Further, in displaying detailed information on each destination, the user interface screen can prevent the user from changing settings of items to be restricted, depending on a protocol-specific destination restriction.

By the way, in the above-described first example, transmission authentication by the LDAP server 300 (see FIG. 1) was described, as an example of the function authentication. However, the function authentication which can be applied to the present embodiment is by no means limited to the function authentication. Further, the function authentication, such as the transmission authentication, is not necessarily required to be performed by the LDAP server 300.

For example, the same advantageous effects as described above can be provided by device authentication as well. In this case, a table storing user names, passwords, and E-mail addresses and network folder paths associated with the respective user names is stored in advance in the HD 210 appearing in FIG. 2. Then, a user name and a password input via the authentication screen are checked against the table.

Further, although in the first example, data of the address book is stored in the HD 210 appearing in FIG. 2, this is not limitative, but in the present embodiment, the address book may not be stored in the HD 210.

For example, the MFP 200 (see FIG. 2) may acquire the directory information managed in the LDAP server 300, using a predetermined protocol and displays a list of the acquired directory information. In short, the MFP 200 may acquire the address book via a network.

Of course, the present embodiment can also be realized by using both the address book stored in the HD 210 and the address book acquired via the network.

Further, although in the first example, a method is employed, by way of example, in which a transmission protocol associated with a new address is selected using a virtual button on a touch panel, this is not limitative, either.

For example, a text-based menu screen may be displayed as a user interface screen on the display 208 (see FIG. 2) such that a transmission protocol associated with a new address can be selected using a cursor key or the like. In this case, the display of the menu is executed in place of the display of buttons in FIG. 9, whereby the same advantageous effects as described above can be obtained.

In addition, in the first example, the "Send Mail To Self" button for use in designating an E-mail address stored in the context 5000, for a destination, is displayed on the display 208.

Similarly, the "Send File To Self" button for use in designating a network folder uniquely determined based on a server and a folder path stored in the context 5000, for a destination, is displayed on the display 208.

It is desirable that an authenticated user can select an E-mail address and a network folder path associated with the user himself/herself by the simplest possible operation, as described above.

However, a configuration for designating a destination by a single button is not essential to the present embodiment. For example, there may be employed a user interface which is configured such that when an "E-Mail" button for selecting a new address is pressed, the screen is switched to an E-mail address input screen on which a check box for designating "Myself" is provided.

In this case, when the check box is selected, an associated mail address stored in the context 5000 is automatically preset in the input screen.

Further, in the above-mentioned configuration, when a transmission protocol for E-mail transmission has been set such that the use thereof is restricted only to an address acquired during the transmission authentication process (transmission address), the associated check box is initially grayed out in the checked state to thereby prevent the automatically preset mail address from being changed. This provides the same advantageous effects as provided by the above-described example.

Specifically, in the present case, the "Send Mail To Self" button and the "Send File To Self" button are configured to be displayed on the display 208 when the new address button 2082 is pressed.

However, the two buttons may be displayed on the same layer as the address book button 2081 and the new address button 2082.

Further, in the above-described first example, a comparison is made in the step S605 or S608 in FIG. 6, using the mail address or the network folder path stored in the context 5000. Further, if the transmission protocol for E-mail transmission or the transmission protocol for file transmission has been set such that the use thereof is restricted only to an address acquired during the transmission authentication process, the destination is displayed in a list only when the result of the comparison indicates a match.

However, if some unit is separately provided which is configured to select an E-mail address or a network folder path associated with the user himself/herself, as a destination, the display restriction processing performed according to the comparison is not essential.

For example, by preventing an "E-mail" address and an "I-FAX" address from being listed in the displayed address book when a transmission protocol for E-mail transmission has been set such that the use thereof is restricted only to an address acquired the authentication transmission process, it is possible to easily obtain the same advantageous effects as provided by the above-described embodiment.

However, it is to be understood that in the above-mentioned case, the restriction on E-mail transmission must not affect the display of the entire address book and the other protocols.

In the above-described first example, the description was given by taking the E-mail transmission protocol (SMTP) and the file transmission protocol (SMB) as examples for transmission protocols. This is because it was assumed that only information on the "E-mail" attribute value and the "home directory" attribute value is stored for management by the LDAP server 300.

However, the present embodiment by no means limits the transmission protocols to these two protocols alone. For example, even in a case where "webdav (distributed authoring and versioning protocol for the WWW) is used a protocol for transmission, it is possible to obtain the same advantageous effects as provided as above. Of course, it is not required to limit the number of transmission protocols to be used to two.

For example, it is possible to provide three options by combination with a protocol for file transmission. As a further alternative, for example, a "facsimile telephone number" attribute value acquired from the LDAP server 300 may be used as the facsimile number acquired during the transmission authentication process, and the facsimile transmission may be permitted only to this acquired facsimile number.

Furthermore, transmission by a predetermined protocol may be permitted only to a transmission destination acquired using not the general attributes mentioned in the above-described example, but a transmission destination acquired using a predetermined attribute in combination with a schema extension or the like of the LDAP server 300.

As described above, according to the MFP 200 as an image forming apparatus implementing the communication apparatus of the embodiment of the present invention, while keeping available the function of multiple destination transmission using a plurality of protocols in a mixed manner and the address book function or the like concerning a plurality of protocols, it is possible to determine whether or not to set destination restriction on a protocol-by-protocol basis.

Further, in the MFP 200 as the image forming apparatus implementing the communication apparatus of the embodiment of the present invention, in displaying detailed information on a transmission destination, it is possible to edit the detailed information according to a transmission protocol-specific restriction on destinations.

As is apparent from the above description, the CPU 201 functions as a display restriction unit, the CPU 201 and the panel 206 function as a setting unit, and the CPU 201 and the network interface card 204 function as an acquisition unit. Furthermore, the panel 206 functions as a new information input unit, and the CPU 201 functions as an edit restriction unit.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

For example, the functions of the above-described embodiment can be realized as a control method by causing an image forming apparatus or the like information processing apparatus to execute the control method. In this case, it is possible to cause a computer provided in the image forming apparatus or the like information processing apparatus to execute a program having the functions of the above-described embodiment.

At this time, the control method and the control program include at least a context holding step, a determination step, and a display restriction step. Alternatively, the control method and the control program include at least a context holding step, a generation step, and a manipulation restriction step.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

This application claims priority from Japanese Patent Application No. 2010-103192 filed Apr. 28, 2010, which is hereby incorporated by reference herein in its entirety.

What is claimed is:

1. A communication apparatus having a transmission function for transmitting data to another apparatus using a transmission protocol, comprising:
    a processor; and
    a memory storing a plurality of units comprising instructions for execution on the processor, the plurality of units including:
    a storage unit configured to store a plurality of destination addresses of the transmission protocol;
    an acquisition unit configured to acquire a destination address of an authenticated user;
    a setting unit configured to configure a setting such that transmission using the destination address acquired by the acquisition unit is permitted, and transmission using other destination addresses than the destination address acquired by the acquisition unit is inhibited;
    a receiving unit configured to receive a display request of an address book from a user;
    a display control unit configured to permit, in a case where the setting is not configured by the setting unit and the receiving unit receives the display request of the address book, a display unit to display the destination address acquired by the acquisition unit and destination addresses other than the destination address acquired by the acquisition unit among the plurality of destination addresses which are stored by the storage unit; and
    an accepting unit configured to accept, from a user, selection of a destination address from among destination addresses displayed by the display unit,
    wherein, the display control unit permits, in a case where the setting is configured by the setting unit and the receiving unit receives the display request of the address book, the display unit to display the destination address acquired by the acquisition unit, and inhibits the display unit to display destination addresses other than the destination address acquired by the acquisition unit among the plurality of destination addresses which are stored by the storage unit.

2. The communication apparatus according to claim 1, wherein the communication apparatus communicates with an LDAP server via a network, and the user is authenticated through communication with the LDAP server.

3. The communication apparatus according to claim 2, wherein in a case where the user is successfully authenticated, the acquisition unit acquires the destination address of the authenticated user from the LDAP server.

4. A communication apparatus according to claim 1, wherein the transmission protocol is SMTP.

5. The communication apparatus according to claim 1, wherein the transmission protocol is SMB.

6. The communication apparatus according to claim 1, further comprising
    a determining unit configured to determine whether the setting is configured by the setting unit,
    wherein the display control unit permits, in a case where the receiving unit receives the display request of the address book and the determining unit determines that the setting is not configured by the setting unit, a display unit to display the destination address acquired by the acquisition unit and the destination addresses other than the destination address acquired by the acquisition among the plurality of destination addresses which are stored by the storage unit, and
    wherein the display control unit permits, in a case where the receiving unit receives the display request of the address book and the determining unit determines that the setting is configured by the setting unit, the display unit to display the destination address acquired by the acquisition unit, and inhibits the display unit to display the destination addresses other than the destination address acquired by the acquisition unit among the plurality of destination addresses which are stored by the storage unit.

7. A method of controlling a communication apparatus having a transmission function for transmitting data to another apparatus using a transmission protocol, comprising:
    storing, in a storage unit, a plurality of destination addresses of the transmission protocol;
    acquiring a destination address of an authenticated user;
    configuring a setting such that transmission using the acquired destination address is permitted, and transmission using other destination addresses than the acquired destination address is inhibited;
    receiving a display request of an address book from a user;
    permitting, in a case where the setting is not configured and the display request of the address book is received, a display unit to display the acquired destination address and destination addresses other than the acquired destination address among the plurality of stored destination addresses which are associated with the transmission protocol; and
    accepting, from a user, selection of a destination address from among destination addresses displayed by the display unit,
    wherein, in a case where the setting is configured, the display unit is permitted to display the acquired destination address and the display unit is inhibited to display destination addresses other than the acquired destination address among the plurality of stored destination addresses which are associated with the transmission protocol.

8. A non-transitory computer-readable storage medium storing a computer-executable program for causing a computer to execute a method of controlling a communication apparatus having a transmission function for transmitting data to another apparatus using a transmission protocol, wherein the method comprises:
    storing, in a storage unit, a plurality of destination addresses of the transmission protocol;

acquiring a destination address of an authenticated user;

configuring a setting such that transmission using the acquired destination address is permitted, and transmission using other destination addresses than the acquired destination address is inhibited;

receiving a display request of an address book from a user;

permitting, in a case where the setting is not configured and the display request of the address book is received, a display unit to display the acquired destination address-destination addresses other than the acquired destination address among the plurality of stored destination addresses which are associated with the transmission protocol; and accepting, from a user, selection of a destination address from among destination addresses displayed by the display unit, wherein, in a case where the setting is configured, the display unit is permitted to display the acquired destination address and the display unit is inhibited to display destination addresses other than the acquired destination address among the plurality of stored destination addresses which are associated with the transmission protocol.

9. A communication apparatus having a transmission function for transmitting data to another apparatus using a transmission protocol, comprising:

a storage unit configured to store a plurality of destination addresses of the transmission protocol;

an acquisition unit configured to acquire a destination address of an authenticated user;

a setting unit configured to configure a setting such that transmission using the destination address acquired by the acquisition unit is permitted, and transmission using other destination addresses than the destination address acquired by the acquisition unit is inhibited; and a display unit configured to display an address book based on the plurality of destination addresses stored in the storage unit;

a control unit configured to permit, in a case where the setting is not configured by the setting unit, selection of the destination address acquired by the acquisition unit on the address book and selection of destination addresses other than the acquired destination address on the address book among the destination addresses which are stored by the storage unit and associated with the transmission protocol, and wherein the control unit permits, in a case where the setting is configured by the setting unit, selection of the destination address acquired by the acquisition unit on the address book, and the control unit inhibits selection of destination addresses other than the acquired destination address on the address book among the destination addresses which are stored by the storage unit and associated with the transmission protocol.

10. The communication apparatus according to claim 9, wherein the communication apparatus communicates with an LDAP server via a network, and the user is authenticated through communication with the LDAP server.

11. The communication apparatus according to claim 10, wherein when the user is successfully authenticated, the acquisition unit acquires the destination address from the LDAP server.

12. The communication apparatus according to claim 9, wherein the transmission protocols is SMTP.

13. The communication apparatus according to claim 9, wherein the transmission protocols is SMB.

14. The communication apparatus according to claim 9, further comprising a determining unit configured to determine whether the setting is configured by the setting unit, wherein the control unit permits, in a case where the determining unit determines that the setting is configured by the setting unit, selection of the destination address acquired by the acquisition unit on the address book and selection of destination addresses other than the acquired destination address on the address book among the destination addresses which are stored by the storage unit and associated with the transmission protocol, and wherein the control unit permits, in a case where the determining unit determines that the setting is not configured by the setting unit, selection of the destination address acquired by the acquisition unit on the address book, and the control unit inhibits selection of the destination addresses other than the acquired destination address on the address book among the destination addresses which are stored by the storage unit and associated with the transmission protocol.

15. A method of controlling a communication apparatus having a transmission function for transmitting data to another apparatus using a transmission protocol, comprising:

storing, in a storage unit, a plurality of destination addresses of the transmission protocol;

acquiring a destination address of an authenticated user;

configuring a setting such that transmission using the acquired destination address is permitted, and transmission using other destination addresses than the acquired destination address is inhibited; and displaying an address book based on the plurality of destination addresses stored in the storage unit;

permitting, in a case where the setting is not configured, selection of the acquired destination address on the address book and selection of destination addresses other than the acquired destination address on the address book among the stored destination addresses which are associated with the transmission protocol, and wherein, in a case where the setting is configured, selection of the acquired destination address on the address book is permitted, and selection of destination addresses other than the acquired destination address on the address book among the stored destination addresses which are associated with the transmission protocol.

16. A non-transitory computer-readable storage medium storing a computer-executable program causing a computer to execute a method of controlling a communication apparatus having a transmission function for transmitting data to another apparatus using a transmission protocol, wherein the method comprises:

storing, in a storage unit, a plurality of destination addresses of the transmission protocol;

acquiring a destination address of an authenticated user;

configuring a setting such that transmission using the acquired destination address is permitted, and transmission using other destination addresses than the acquired destination address is inhibited; and displaying an address book based on the plurality of destination addresses stored in the storage unit;

permitting, in a case where the setting is not configured, selection of the acquired destination address on the an address book and selection of destination addresses other than the acquired destination address on the address book among the stored destination addresses which are associated with the transmission protocol, and wherein, in a case where the setting is configured, selection of the acquired destination address on the address book is permitted, and selection of destination addresses other than the acquired destination address on the address book among the stored destination addresses which are associated with the transmission protocol is inhibited.

* * * * *